W. COOPER.
CAR LIGHTING SYSTEM.
APPLICATION FILED SEPT. 10, 1909.

1,079,400.

Patented Nov. 25, 1913.

WITNESSES:

INVENTOR
William Cooper
BY
ATTORNEY

UNITED STATES PATENT OFFICE.

WILLIAM COOPER, OF PITTSBURGH, PENNSYLVANIA, ASSIGNOR TO WESTINGHOUSE ELECTRIC AND MANUFACTURING COMPANY, A CORPORATION OF PENNSYLVANIA.

CAR-LIGHTING SYSTEM.

1,079,400.

Specification of Letters Patent. Patented Nov. 25, 1913.

Application filed September 10, 1909. Serial No. 517,151.

*To all whom it may concern:*

Be it known that I, WILLIAM COOPER, a citizen of the United States, and a resident of Pittsburgh, in the county of Allegheny and State of Pennsylvania, have invented a new and useful Improvement in Car-Lighting Systems, of which the following is a specification.

My invention relates to systems of electric lighting and particularly to such systems as are adapted for use with electrically propelled cars and other railway vehicles.

The object of my invention is to provide an improved system of the class above indicated in which the intensity of the light produced may be maintained substantially constant, irrespective of the voltage variations in the supply circuit from which the propelling motors of the vehicle receive energy.

According to my invention, I equip the vehicle with a motor generator or booster set and provide automatic means for so regulating the field of the booster generator as to maintain a constant supply of energy to the lighting circuit.

Figure 1:
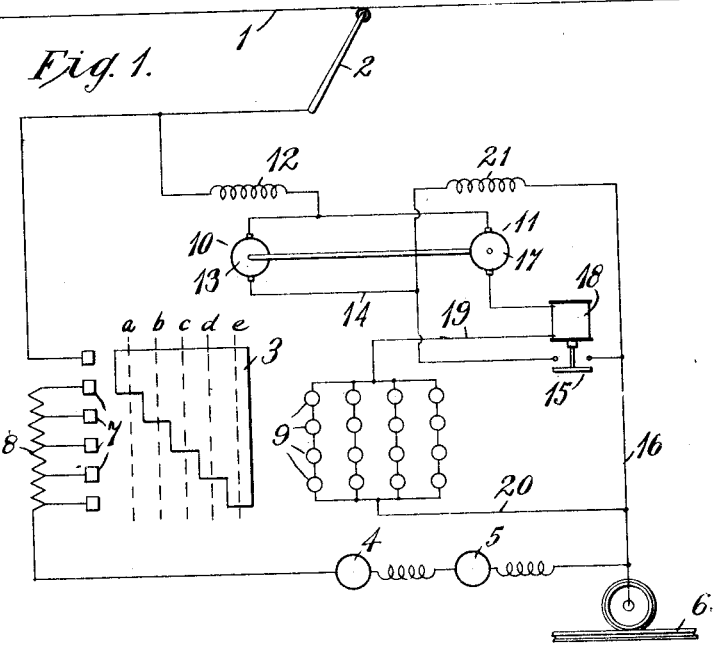
Figure 2:
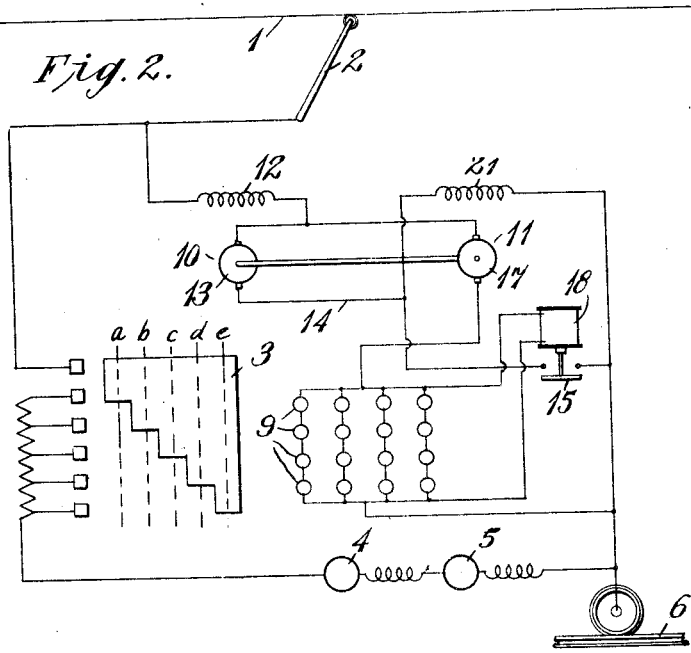

Figure 1 of the accompanying drawings is a diagrammatic view of a lighting system embodying my invention and Fig. 2 is a similar view of a slightly modified arrangement, the field regulation of the booster generator being effected, in the one case, by the current supplied to the lighting circuit and, in the other case, by the voltage impressed upon said circuit.

Referring to Fig. 1 of the drawings, energy is supplied from any suitable source through a conductor 1, a traveling contact 2, and a controller 3 to the propelling motors 4 and 5 of an electric vehicle, a circuit being completed through the return circuit rail conductor 6.

The drum of the controller 3 is adapted to occupy positions *a*, *b*, *c*, *d* and *e* with reference to the fingers 7, in order to effect rheostatic control of the motors by means of a resistance 8 from which taps are connected to the contact fingers 7. The control of the propelling motors forms no part of my present invention, and the arrangement shown is intended to be illustrative of any suitable motor controller.

The vehicle is provided with a plurality of lamps 9, which are arranged in four circuits in multiple of four lamps each; a motor 10 and a booster generator 11 which is operatively connected to the motor and is adapted to supply energy to the lamps 9.

As already pointed out, the main motor circuit is established through the controller 3 but a second circuit is also established from the traveling contact member 2 through field magnet winding 12 and armature 13 of the motor 10, conductor 14, relay switch 15 and conductor 16 to the return circuit conductor 6. The driving motor 10 of the booster set has the characteristics of a series wound motor, since all of the current in the armature circuit traverses the field magnet winding, and is connected, either directly across the main circuit, or in series relation to the field magnet winding 21 of the booster generator, according as the relay switch 15 is closed or open.

A branch circuit is established from the traveling contact 2 through the field magnet winding 12 of the motor 10, armature 17 of the booster generator 11, magnet winding 18 of relay switch 15 and conductor 19 to the lamps 9, a circuit being completed from this point through conductor 20 to return conductor 6. The generator field magnet winding 21 is provided with energy from conductor 14, it being connected in multiple circuit with the relay switch 15, as above indicated.

The operation of the system is as follows: Assuming that the motor 10 is operating with the relay switch 15 closed and that the energy is being supplied to the lamps 9 through the generator armature 17, if, under these conditions, the voltage of the line 1 decreases, the voltage and current supplied to the motor 10 and to the lamps 9 will decrease until the relay switch 15 is temporarily opened. When the relay switch opens the motor circuit is completed directly through the field magnet winding 21 of the generator 11, thereby causing said machine to supplement the line voltage. The voltage impressed upon the lamp circuit is thus lowered and raised intermittently between limits which are determined by the action and position of the relay switch 15 but, in practice, the relay switch is found to vibrate between its open and its closed position either rapidly or slowly, depending upon the fluctuations of the line voltage, and thereby to maintain a substantially constant potential across the lamp circuit.

In the diagram of Fig. 2, the circuit connections are similar to those of Fig. 1, except that the magnet winding 18 of the relay switch 15 is connected in multiple circuit with the lamps 9 and is, consequently, dependent upon the voltage impressed upon the lamp circuit instead of upon the current supplied to it. The operation of this system is similar to that of Fig. 1.

My invention is not restricted to car lighting systems, and I desire that its scope shall only be limited by the appended claims.

I claim as my invention:

1. In an electric current distributing system, the combination with a source of variable-voltage energy, translating devices requiring a substantially constant-voltage supply of energy, an electric motor having a field magnet winding pertaining thereto, a generator operatively connected to said motor for supplying energy to the translating devices, and a field magnet winding pertaining to the generator, of electro-responsive means adapted to short circuit the field magnet winding pertaining to the generator, said means being dependent upon a function of the energy supplied to the translating devices.

2. In an electric current distributing system, the combination with a source of variable-voltage energy, a motor connected thereto, a generator driven by the motor, a plurality of translating devices supplied with energy from said source through the armature of said generator, and means dependent upon a function of the energy supplied to the translating devices for short-circuiting the generator field magnet.

3. In an electric current distributing system, the combination with a supply circuit of variable voltage, an electric motor connected thereto having an armature and field magnet winding, a generator operatively connected to the motor, translating devices connected in series with the generator armature, and means dependent upon the current supplied to the translating devices for short-circuiting the field magnet of the generator, said generator armature and translating devices being electrically connected in multiple circuit to the armature of the motor and the field magnet of the generator.

4. In an electric current distributing system, the combination with a source of variable-voltage energy, a motor connected thereto, a generator operatively connected to the motor and having a field magnet winding connected in series relation with the motor armature, a relay switch adapted to short-circuit the generator field magnet and having an actuating magnet connected in series circuit with the field magnet of the motor, the armature of the generator and translating devices to which it is desired to supply constant current energy being connected to the source of energy through the motor field winding.

In testimony whereof, I have hereunto subscribed my name this 30th day of Aug., 1909.

WILLIAM COOPER.

Witnesses:
G. H. HARTSOUGH, Jr.,
B. B. HINES.